March 14, 1950 — D. W. RITENOUR — 2,500,869
ROTARY CULTIVATOR ATTACHMENT
Filed Feb. 2, 1945
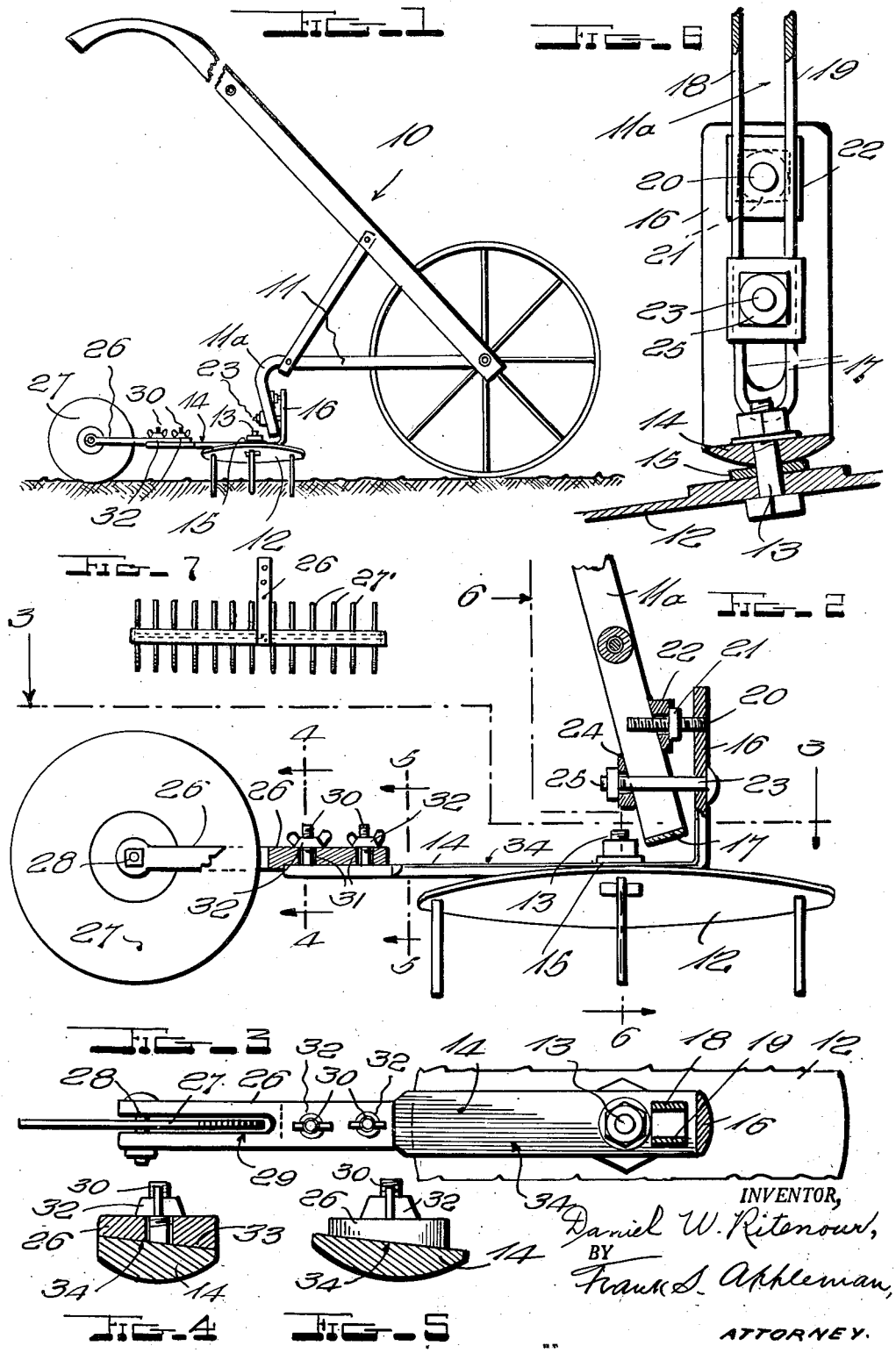
INVENTOR,
Daniel W. Ritenour,
BY Frank L. Appleman,
ATTORNEY.

Patented Mar. 14, 1950

2,500,869

UNITED STATES PATENT OFFICE 2,500,869

ROTARY CULTIVATOR ATTACHMENT

Daniel W. Ritenour, Winchester, Va.

Application February 2, 1945, Serial No. 575,791

4 Claims. (Cl. 55—13)

This invention relates to rotary cultivator assemblages, and has particular relation to assemblies of the type disclosed in the patent granted to me January 16, 1946, No. 2,393,190.

An object of this invention is to provide novel means for mounting a rotary cultivator on hand push-plow beams which are manually, mechanically, or otherwise propelled or moved, and a further object of the invention is to so mount the cultivator attachment that it will cant or tilt laterally at about 12 degree angle in order to effect the rotary drive of the toothed member which, as shown in the aforesaid application, may assume various modes and modifications as to the teeth and soil-working instrumentalities carried by the disk or plate of the cultivator attachment.

It is furthermore an object of the invention to provide fittings which will adapt it for association with hand push-plow standards of different contours or curves to bring the teeth or operating instrumentalities into proper relation with the surface to be treated by them.

It is a still further object of the invention to provide a mounting for the hand push-plow cultivator attachable, as aforesaid, to the standard, and having a guiding instrument rearwardly of the rotary element of the cultivator attachment, effective to prevent lateral movement of the cultivator attachment, which movement might be produced on account of the fact that the teeth on the lower edge of the disk have greater resistance than those teeth on the opposite edge of the disk as it is in motion, for by reason of the greater depth of the teeth at one edge than the other, the rotary action is induced.

It is furthermore an object of the invention to provide the guiding means with mountings which are removably attached to the means for mounting the cultivator attachment on the standard and, in practice, a plurality of attachments are available to produce different functions or results, since a single guiding fin may be employed as the simplest form of guide, or a rotary disk, or a plurality of disks may be mounted on an attachment to be fixed or removably secured on the said attachment; and in a more elaborate means a plurality of disks in the nature of a disk harrow cutter could be substituted to follow the rotary cultivator attachment, for the purpose of more effectually cultivating the growing crops.

It is apparent that the improvement is directed to a simplified mounting and to guard against lateral displacement of the rotary cultivator, and the invention resides in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of a rotary cultivator assembled as a push element;

Figure 2 illustrates a detail view of the disk and its mounting on a standard of the hand push-plow attachment, parts being in section;

Figure 3 illustrates a sectional view of the disk and its mounting on the line 3—3 of Fig. 2;

Figure 4 illustrates a sectional view of the device on the line 4—4 of Fig. 2;

Figure 5 illustrates a sectional view of the device on the line 5—5 of Fig. 2;

Figure 6 illustrates a sectional view of the device on the line 6—6 of Fig. 2, omitting the teeth of the disk; and Figure 7 illustrates a diagrammatic view on a reduced scale showing a guiding attachment with a plurality of disks.

In these drawings 10 denotes a conventional form of wheeled cultivator having a beam 11 with its outer end downwardly curved to form a standard 11a, and as the curvatures of beams of different cultivators vary, provision is made for setting the mounting of the rotary disk cultivator 12 in proper relation to the standard, and handles for the manual propulsion of the cultivator, the said handles being broken away as they are intended to project a sufficient distance rearwardly of the disk to provide space for the operator rearwardly of the cultivating mechanism. In the present embodiment of the invention, the disk 12 is rotatably mounted on a stud 13, which is in the nature of a bolt, extending through the disk and through a plate or bar 14, and the bolt is set diagonally to a slight degree so that the disk is in an inclined or canted position in order that the teeth of one side of the disk penetrate the soil to a slightly greater degree than the teeth on the opposite side of the disk. An appropriate washer 15 is interposed between the disk and the lower surface of the plate, and it is shown that the said plate is convex on its surface and this shape also applies to the angularly disposed arm 16 integral with the plate.

The standard 11a is formed by bending a length of flat metal on itself to produce a loop 17 with the parallel lengths 18 and 19 of the metal spaced apart, and this construction produces a strong and rigid standard and support for the cultivator attachment.

The arm 16 has a threaded stud 20 anchored in it and it projects a suitable distance from the arm. It has a nut 21 threaded on it and it is adjustable to regulate the position of the arm with relation to the standard in order that the cultivator disk may be positioned in the proper plane with respect to the soil to be cultivated. The adjustment of the nut adapts the arm to standards having different curves, by reason of the fact that the nut 21 bears against a beveled metal block 22 whose inner surface bears against the edges of the metal forming the standard, for it will be obvious that to have the arm vertically disposed with relation to an inclined surface of the standard, adjustment of the nut 21 must be made to regulate the position of the arm with respect to the standard when the bolt 23, which anchors the arm to the standard, is fastened in place. To compensate for the angularity of the standard, a washer or block 24 is interposed between the nut 25 of the bolt 23 and the edge of the standard so that a direct pressure is exerted on the standard and that sufficient frictional contact results, due to the fact that the washer has a beveled surface which contacts the said standard.

It has been found desirable to provide means for preventing lateral swaying movement of the disk, owing to the fact that the resistance on one side of the disk as it operates is greater than it is on the other, due to the inclination of the disk. Means are provided as an attachment to the plate 14 for preventing lateral movement of the disk during its rotation, and, owing to the fact that the upper surface of the plate is canted slightly, it is desirable to mount the attachment for preventing lateral movement so that it travels in a true vertical position. The attachment, in the present embodiment, consists of an arm 26 on which a colter disk 27 is rotatably mounted through the employment of a pivot or bolt 28 extending through the bifurcated end of the arm, it being shown that the disk rotates in the furcation 29. This disk will imbed itself in the soil and serve as an anchor against lateral movement or strain of the disk. A plurality of such disks may be employed and may be increased to a degree where several disks 27' following the cultivator attachment would act as a disk harrow for further cultivating the growing crops or, as another expedient, the disk may be held stationary to form a fin or rudder which, while traveling in the soil, would resist sidewise movement of the disk.

It is shown that the plate 14 is provided with threaded studs 30 and that the arm 26 has apertures 31 to receive the said studs and when the arm is applied to the studs, it is clamped into position by thumb nuts 32 threaded on the studs.

It is shown that in Figures 4 and 5 that in order to compensate for the slant of the upper surface of the plate, the lower surface 33 of the arm which engages the plate is beveled with respect to the upper surface 34 of the said arm 26, and the angle of the bevel must be determined by the transversely inclined surface of the plate 14 as this relation of parts is desirable to properly position the attachment comprising the arm 26 and disk 27 with relation to the cultivating disk, and to insure that the disk is vertical so that it may travel in a straight direction. It is desirable to further emphasize the fact that the guiding means may be in the nature of a fin, rigid with the arm 26, that it may comprise a disk rotatably mounted or fixed so that it will act as a guide, or that a plurality of disks may be mounted in spaced relation to one another which is in the nature of a disk harrow. From the above, taken in connection with the drawings, it is apparent that the assembly provides a number of characteristic features. As in the assembly disclosed in my earlier patented disclosure above identified, the disk 12 is designed to have a canted relation to the line of draft with the inclination extending transversely to such line of draft and with the assembly capable of providing limited variations in the degree of inclination. However, due to changes in the form of the transporting structure, the mounting of the disk has been materially changed, since the standard 11a does not permit of adjustment of the angularity of the disk in the manner previously employed; previously the adjusting means was made effective at the side of the standard and thus the adjustment was in accord with the direction of length of the inclination—with the present standard the adjustment must cooperate with the standard in a different manner, due to the formation of the standard.

Since the disk is not inclined in the fore and aft or line of draft direction, arm 16 extends vertically, and is secured to the standard through bolt 23, so that the axis of this bolt forms a pivoting axis about which it is possible for arm 16 to move within a limited range; obviously, any swing of the arm on such axis affects the angularity of the disk transversely of the line of draft, since the angularity of the face of plate 14 is varied transversely by such swing. As shown in Figure 2, the opening in block 22 is materially larger than the size of screw 20, so that the screw can shift position within the opening when nut 21 is loosened without affecting the position of block 22 relative to the arms 18 and 19 of the standard, thus permitting the small range of adjustment shown and which is sufficient for the purpose, due to the position of screw 20 but a short radial distance from the axis of bolt 23—shift relative to the standard itself is possible due to the spacing of arms 18 and 19. After the disk angularity is obtained, nut 21 is tightened against block 22, setting up the extended frictional contact between nut and block to maintain the adjusted position and inclination.

As will be understood, the maintained frictional contact of nut and block is obtained by the leverage conditions present, aided by the weights carried by plate 14 and its extension 26 with bolt 23 as the fulcrum, thus producing a large leverage factor applying pressure on nut 21 to maintain the position of the screw relative to the block. The position of the nut 21 on the screw will determine the position of plate 14 in the fore and aft direction, so that fine adjustment of the latter is also possible.

I claim:

1. In a rotary cultivator, a transporting means for the cultivator having a curved standard, a plate having an angularly disposed arm attached to the standard so that the plate extends rearwardly thereof, a cultivating disk having teeth, means for mounting the disk on the plate for rotation in a transversely canted position and means for controlling and maintaining the angularity of the disk, said means including, a threaded stud attached to and extending rearwardly from the arm, said stud projecting into the standard, a nut on said stud between the arm and the standard, a filling block between the nut and the standard for regulating the angularity of the arm with relation to the standard, and means attached to the arm for fastening the arm to the standard.

2. In a rotary cultivator, a transporting means for the cultivator having a curved standard, a plate having an angularly disposed arm attached to the standard so that the plate extends rearwardly thereof, a cultivating disk having teeth, means for mounting the disk on the plate for rotation in a transversely canted position and means for controlling and maintaining the angularity of the disk, said means including, a threaded stud attached to and extending rearwardly from the arm, said stud projecting into the standard, a nut on said stud between the arm and the standard, a filling block between the nut and the standard for regulating the angularity of the arm with relation to the standard, and means attached to the arm for fastening the arm to the standard, said means comprising a bolt extending through the arm and standard, said bolt having a nut on its end remote from the arm, and an interposed tapered block having one surface engaging the standard and the other surface engaged by the nut.

3. In a rotary cultivator, a plate having an angularly disposed arm for attachment to a standard of a cultivator so that the plate extends rearwardly from the arm, adjustable means for attaching the arm to standards of different shapes or inclinations, said means comprising a threaded stud anchored to the arm and adapted to project into the standard, a nut threaded on the stud for abutting the standard and regulating the position of the arm with relation to the standard, and a fastening spaced from the stud and by which the arm is attached to the standard; a cultivating disk having teeth, means for mounting the disk on the plate for rotation in a transversely canted position, means for guiding the disk and preventing lateral thrust comprising a member attached to the end of the plate and a fin attached to and depending from said member.

4. A rotary cultivator attachment comprising a plate extending in fore and aft direction and having an arm adapted to be attached to a standard of a transporting means, said plate having its upper surface canted transversely, a cultivator disk having teeth, a member extending through the plate and through the disk and operative to rotatably mount the disk in a transversely canted position, an arm contacting the plate rearward of the disk and attached thereto and having a surface contacting the plate canted opposite to the cant of the plate, and guiding means carried by the arm, said guiding means comprising a disk adapted to penetrate the soil for holding the attachment against lateral thrust and for treating the soil back of the cultivating disk.

DANIEL W. RITENOUR.

REFERENCES CITED

The following references are of record in the file of this patent:

UNITED STATES PATENTS

| Number | Name | Date |
|---|---|---|
| 135,664 | Poundstone | Feb. 11, 1873 |
| 550,614 | Hewitt | Dec. 3, 1895 |
| 742,925 | Storey | Nov. 3, 1903 |
| 789,275 | Harris | May 9, 1905 |
| 799,783 | Ette | Sept. 19, 1905 |
| 872,959 | McGehe | Dec. 3, 1907 |
| 894,966 | Messer et al. | Aug. 4, 1908 |
| 1,014,572 | Davis | Jan. 9, 1912 |
| 1,608,666 | Plum | Nov. 30, 1926 |
| 1,838,355 | Benjamin | Dec. 29, 1931 |
| 1,855,951 | Franklin | Apr. 26, 1932 |
| 2,061,694 | Cuddigan | Nov. 24, 1936 |
| 2,205,188 | Cuddigan | June 18, 1940 |
| 2,393,190 | Ritenour | Jan. 15, 1946 |